Dec. 20, 1966     B. J. BUCHANAN     3,292,579
AQUARIUM POWER SUPPLY
Filed June 24, 1965
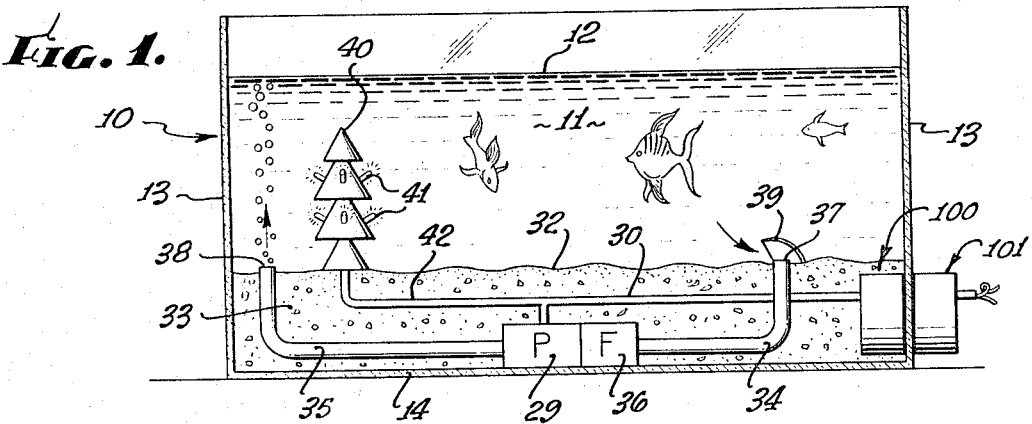
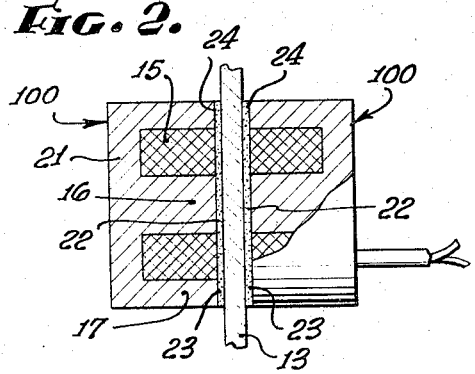
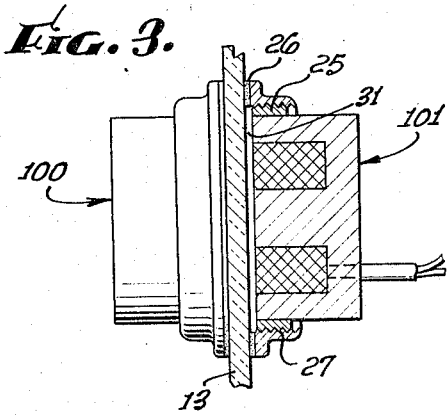
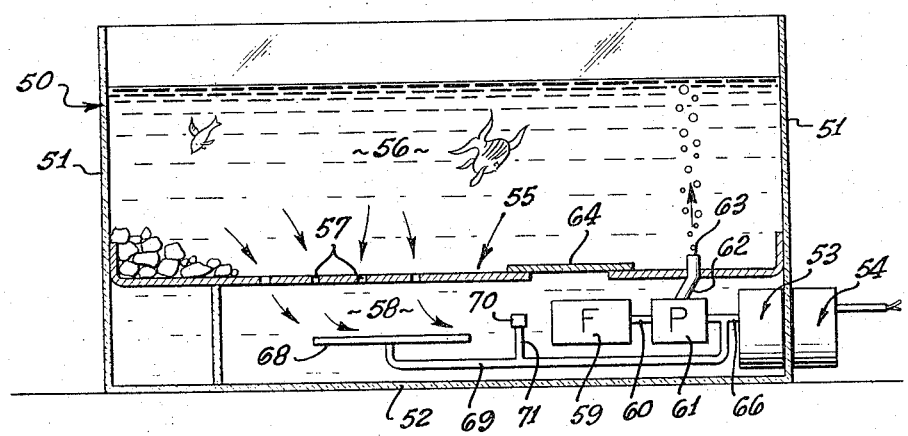
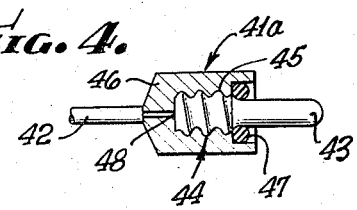
INVENTOR.
BEVERLY J. BUCHANAN
by White & Haefliger
ATTORNEYS.

United States Patent Office 3,292,579
Patented Dec. 20, 1966

3,292,579
AQUARIUM POWER SUPPLY
Beverly J. Buchanan, 3915 Boutin Drive,
Lakewood, Calif. 90712
Filed June 24, 1965, Ser. No. 466,731
19 Claims. (Cl. 119—5)

This invention relates generally to operation of aquariums, and more specifically concerns the transmission of electrical power into aquarium tanks for operating equipment therein.

It is desirable from the standpoint of attractiveness that aquarium tanks have an appearance free of conduits and lines extending up over the upper rim of the tank and then down into the tank; however, such lines and conduits, as for example air lines, have been considered necessary in the past inasmuch as air pumps and other powered equipment are conventionally operated outside the tank.

The present invention has a major object the elimination of lines and conduits running over the top wall of the tank, thereby to substantially improve the overall appearance of the aquarium. Other objects include the concealment of power lines and conduits at or near the bottom of the tank, the electrical operation of lights, heaters, thermostats, filters and motor driven equipment such as pumps beneath the surface of water in the aquarium tank with or without concealment, and the transmission of electrical power into the tank and below the water surface thereof without an electrical line running into the tank, the power so transmitted being at sufficiently low voltage as to safely operate electrical equipment submerged in the tank water.

Basically, the above objects are realized in accordance with the invention by providing means to transmit electrical power from the exterior to the interior of the tank, and including electromagnets at the outside and inside of the tank with opposed pole faces at opposite sides of the tank wall. Typically, the electromagnet coil windings will be adjusted in such relation to the spacing of the electromagnets so that normal home power service at 120 volts A.C. upon application to the outer electromagnet coil will result in the transmission of power to the electromagnet at the inside of the tank, the voltage delivered by coil at the inside electromagnet being sufficiently reduced, say between 10 and 40 volts A.C., that the submerged equipment may be safely electrically operated. As will appear, support means is typically provided to support the electromagnets respectively at the outside and inside of the tank, with two pairs of pole faces adapted for location by the support means to provide a magnetic circuit passing through the wall at spaced locations. The support means may comprise an adhesive material located to bond the pole faces directly to the tank wall, whereas in another form of the invention the support means may include a carrier attachable to the tank wall to carry at least one electromagnet for adjustable movement toward and away from the tank wall, thereby to control the voltage delivered by the inside electromagnet to the powered equipment.

Other features of the invention include the provision of an electrical power utilization device in the tank and below the water surface level therein, and characterized as operable by the electromagnet inside the tank; the inclusion in the tank of a perforated false bottom concealing the inside electromagnet as well as a water pump and filter operated by that electromagnet to effect flow of aquarium water generally vertically through the perforations; the electromagnet operation of a low voltage light source located to provide illumination inside the tank and above the false bottom; and the thermostat controlled operation of a water heater by the electromagnet concealed inside the tank.

These and other objects and advantages of the invention, as well as the details of illustrative embodiments will be more fully understood from the following detailed description of the drawings in which:

FIG. 1 is a vertical elevation taken in section through an aquarium tank embodying the invention;

FIG. 2 is an enlarged vertical section showing electromagnets bonded to an aquarium tank wall;

FIG. 3 is an enlarged vertical section showing electromagnets adjustably carried to move relative to an aquarium tank wall;

FIG. 4 is an enlarged vertical section showing a light source having a plug and socket with a water tight seal positioned therebetween; and FIG. 5 is a view like FIG. 1, but showing a modified tank interior including a false bottom.

Referring first to FIGS. 1 and 2, the aquarium tank 10 is filled with water 11 to surface level 12, and has side walls 13 as well as a bottom wall 14.

In accordance with the invention, means is provided to transmit electrical power from the exterior to the interior of the tank in such manner that no cords or fluid lines need be strung or run over the top of the wall 13, said means including electromagnets at the outside and inside of the tank and having opposed pole faces at opposite sides of the side wall 13 or bottom wall 14. Typically, though not necessarily, the inside and outside electromagnets 100 and 101 may each have a ring shaped coil 15 that extends about an inner pole 16 and within an outer cup-shaped pole 17, it being understood that each pair of poles 16 and 17 comprise portions of the electromagnet laminated ferrous core which also has a base 21. The center poles 16 provide opposed pole faces 22, whereas the outer annular poles 17 have opposed pole faces 23, the proximity of these faces being such in relation to the coil windings and core size that relatively low voltage, i.e. 10–40 volts, is produced at the output leads of the inside electromagnet 100, whereby the electrical equipment submerged in the tank water may be successfully operated. Typically, a substantial step-down in voltage occurs during power transmission from the outside electromagnet 101 to the inside electromagnet, inasmuch as the outside electromagnet coil is supplied with 110 to 120 volts, A.C. at leads 28.

FIGS. 1 and 2 also illustrate one form of means to support the electromagnets at the outside and inside of the tank wall 13 so that the magnet flux path may pass through the glass wall at spaced locations, i.e. between faces 22 and between faces 23, thereby to provide a magnetic circuit. Typically, the electromagnet support means may comprise an adhesive material indicated at 24 in thin layers between the wall 13 and the pole faces 22 and 23 of the electromagnets. The support means may also include a carrier attachable, as by bonding, to the tank wall to carry at least one electromagnet for adjustable movement toward and away from the tank wall. As an example of this, FIG. 3 illustrates a carrier ring 25 for each electromagnet, the ring bonded to the wall at 26. The electromagnet and ring have screw thread attachment at 27 to allow rotation of the electromagnet, against some interference imposed by the carrier ring thread, thereby to adjust the closeness of the pole faces 22 and 23 to the glass wall and to the opposed pole faces of the electromagnet, as for example is indicated by gap 31. This adjustment provides for adjustment of the output power and voltage at the leads of the inside electromagnet coil, for application to the electrical power utilization devices submerged in the tank.

FIG. 1 illustrates one such utilization device to comprise an electrical motor driven pump 29, also indicated at P, and supplied with power via lead 30 extending from the coil of inside electromagnet 100. Pump 29 is submerged in the tank, typically below a false bottom such as the upper surface 32 of the sand layer 33. Lines 34 and 35 mainly concealed below surface 32 conduct aquarium water through the pump and a filter 36 in circulation series with the pump, line 34 having an inlet 37 spaced from outlet 38 of line 35. If desired, inlet 37 and outlet 38 may be concealed beneath objects in the tank such as shell 39, whereby the aquarists' observation of the tank and the marine life therein is completely undisturbed by power operated components and devices necessary to proper functioning and maintenance of the aquarium tank.

FIG. 1 also illustrates a tree-like fixture 40 projecting above the surface 32, and having electrical lights 41 located to provide illumination visible above the false bottom 32. Lights 41 are supplied at 42 with low voltage power from the coil of the inside electromagnet 100. FIG. 4 shows a typical light unit 41a with a bulb 43 carried on plug 44 threaded at 45 into socket 46. An O-ring seal 47 may be provided to seal off between the bulb 43 at the thread 45, preventing access of water to the terminal 48 at the base of the plug.

Turning now to FIG. 5, the tank 50 has side and bottom walls 51 and 52, inside and outside electromagnets 53 and 54 respectively being carried at wall 51 in the same manner as discussed above. A false bottom in the form of a horizontal panel 55 is provided in the tank to conceal the inside electromagnet submerged in the tank water 56. The panel is perforated at 57 to pass water downwardly therethrough into the concealed zone 58 for circulation toward and through the concealed filter 59, conduit 60, motor driven pump 61, and conduit 62 to exit at 63 into the tank interior above the false bottom. The latter may include a removable section 64 overlying the filter, to permit periodic removal and replacement of the latter. As before, the electric motor for pump 61 may be operated by low voltage power supplied at 66 from the inside electromagnet.

Also concealed below the false bottom 55 are a heater plate 68 in zone 58 and supplied with power via lead 69 from the inside electromagnet. A thermostat 70 is connected at 71 in series with lead 69 to control the operation of the plate so as to keep the water temperature within a predetermined range. As before, the powered equipment is operated underwater at low voltage, obviating electrical shorting problems, and the powered components are concealed from the critical view of the aquarist.

I claim:

1. In combination, an aquarium tank having an electrically non-conducting water retaining wall, and means to transmit electrical power from a power supply source at the exterior to a power utilization device at the interior of the tank, said means including electromagnets at the outside and inside of the tank and having opposed pole faces at opposite sides of said wall.

2. In combination, an aquarium tank having an electrically non-conducting water retaining wall, and means to transmit electrical power from a power supply source at the exterior to a power utilization device at the interior of the tank, said means including electromagnets at the outside and inside of the tank and having opposed pole faces at opposite sides of said wall, and adhesive bonding said pole faces to said wall.

3. In combination, an aquarium tank having an electrically non-conducting water retaining wall, means to transmit electrical power from a power supply source at the exterior to a power utilization device at the interior of the tank, said means including two electromagnets respectively at the outside and inside of the tank and having opposed pole faces at opposite sides of said wall, there being at least two pairs of said opposed pole faces to provide a magnetic circuit passing through the wall at spaced locations.

4. The combination of claim 3 in which each electromagnet has a current carrying coil, the number of coil turns being such that a substantial step-down in voltage occurs during power transmission from the outside electromagnet to the inside electromagnet.

5. The combination of claim 4 including an electrical power utilization device in the tank below the water surface level therein, said device being electrically connected with said inside electromagnet.

6. The combination of claim 5 including a false bottom in the tank overlying said inside electromagnet.

7. The combination of claim 6 in which said false bottom contains perforations and said device comprises an electrical motor driven water pump operable below said bottom to effect flow of aquarium water generally vertically through said perforations.

8. The combination of claim 7 including a water filter located below said false bottom to pass the flow of water circulating below said false bottom.

9. The combination of claim 5 in which said device includes a low voltage source of light located to provide illumination visible above said false bottom.

10. The combination as defined in claim 6 in which said false bottom comprises particulate solid material.

11. The combination of claim 6 in which said false bottom comprises a panel.

12. The combination of claim 5 in which said device comprises a water heater.

13. The combination of claim 5 in which said device comprises a thermostat.

14. The combination of claim 4 including means to adjust the spacing of said opposed pole faces.

15. The combination of claim 14 in which said means includes a carrier attachable to the tank wall to carry at least one electromagnet for adjustable movement toward and away from the tank wall.

16. For combination with an aquarium tank having an electrically non-conducting water retaining wall, means to transmit electrical power from a power supply source at the exterior to a power utilization device at the interior of the tank, said means including two electromagnets having pole faces, and means to support the electromagnets respectively at the outside and inside of the tank with said pole faces opposed at opposite sides of the tank wall.

17. The combination of claim 16 in which there are at least two pairs of said pole faces adapted for location by said support means to provide a magnetic circuit passing through the wall at spaced locations.

18. The combination of claim 17 in which said support means comprises an adhesive material.

19. The combination of claim 17 in which said support means includes a carrier attachable to the tank wall to carry at least one electromagnet for adjustable movement toward and away from the tank wall.

References Cited by the Examiner

UNITED STATES PATENTS

| | | | |
|---|---|---|---|
| 1,939,583 | 12/1933 | Welshavsen | 119—5 X |
| 2,379,664 | 7/1945 | Stanko | 336—178 |
| 2,566,990 | 9/1951 | Mahle | 219—316 |
| 3,199,932 | 8/1965 | Clark | 308—10 |
| 3,208,090 | 9/1965 | Roesel | 119—5 X |
| 3,232,271 | 2/1966 | Dosamantes De Jose | 119—5 |

FOREIGN PATENTS 1,267,479   6/1961   France.

ALDRICH F. MEDBERY, *Acting Primary Examiner.*